(12) United States Patent
Yamawaki

(10) Patent No.: US 11,212,250 B2
(45) Date of Patent: Dec. 28, 2021

(54) RELAY DEVICE, NETWORK SYSTEM, AND NETWORK CONTROL METHOD

(71) Applicant: NEC CORPORATION, Tokyo (JP)

(72) Inventor: Ai Yamawaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 96 days.

(21) Appl. No.: 16/497,620

(22) PCT Filed: Mar. 20, 2018

(86) PCT No.: PCT/JP2018/011033
§ 371 (c)(1),
(2) Date: Sep. 25, 2019

(87) PCT Pub. No.: WO2018/180767
PCT Pub. Date: Oct. 4, 2018

(65) Prior Publication Data
US 2021/0112028 A1   Apr. 15, 2021

(30) Foreign Application Priority Data
Mar. 31, 2017   (JP) ............................. JP2017-070400

(51) Int. Cl.
*H04L 29/08* (2006.01)
*H04L 29/12* (2006.01)
*G06F 16/95* (2019.01)

(52) U.S. Cl.
CPC ...... *H04L 61/1511* (2013.01); *H04L 61/1558* (2013.01); *H04L 61/2514* (2013.01); *H04L 67/28* (2013.01); *G06F 16/95* (2019.01)

(58) Field of Classification Search
CPC ... H04L 61/1511; H04L 67/02; H04L 67/025; H04L 67/28–2857; G06F 16/95–986
See application file for complete search history.

(56) References Cited

U.S. PATENT DOCUMENTS 7,720,997 B1 *   5/2010   Gourlay .................. H04L 61/35
                                                    709/245
7,882,268 B1 *   2/2011   Broido ................ H04L 61/1511
                                                    709/245
(Continued)

FOREIGN PATENT DOCUMENTS

JP   2001-101061 A   4/2001
JP   2008-236297 A   10/2008
(Continued)

OTHER PUBLICATIONS

International Search Report for PCT/JP2018/011033 dated Jun. 19, 2018 [PCT/ISA/210].
(Continued)

*Primary Examiner* — David R Lazaro
*Assistant Examiner* — Julian Chang
(74) *Attorney, Agent, or Firm* — Sughrue Mion, PLLC

(57) ABSTRACT

A network system according to the present invention includes: a server that provides a content to a communication terminal; a relay device that establishes a connection with the server; and a DNS server that stores an IP address of the server. When accepting an inquiry of the IP address of the server being a providing source of the content from the communication terminal, the relay device inquires the IP address from the DNS server, and performs in parallel processing of transmitting the IP address received in response to the inquiry to the communication terminal, and processing of establishing a connection with the server assigned the IP address.

2 Claims, 11 Drawing Sheets

(56) References Cited

U.S. PATENT DOCUMENTS

| | | | |
|---|---|---|---|
| 9,756,071 B1* | 9/2017 | Golshan | H04L 63/1458 |
| 2007/0124487 A1* | 5/2007 | Yoshimoto | H04L 61/1511 |
| | | | 709/230 |
| 2011/0153867 A1* | 6/2011 | van de Ven | H04L 67/02 |
| | | | 709/245 |
| 2012/0117621 A1* | 5/2012 | Kondamuru | H04L 61/1511 |
| | | | 726/3 |
| 2013/0198269 A1* | 8/2013 | Fleischman | H04L 61/20 |
| | | | 709/203 |
| 2014/0344925 A1* | 11/2014 | Muthiah | H04L 67/2804 |
| | | | 726/22 |
| 2015/0281111 A1* | 10/2015 | Carl | H04L 47/70 |
| | | | 709/226 |
| 2016/0308818 A1* | 10/2016 | Torres | H04L 45/741 |
| 2016/0323409 A1* | 11/2016 | Kolhi | H04L 67/2847 |
| 2018/0026935 A1* | 1/2018 | Ripke | H04L 61/6009 |
| | | | 709/213 |
| 2018/0049253 A1* | 2/2018 | Lee | H04L 61/6009 |
| 2018/0139224 A1* | 5/2018 | Arnell | H04L 41/12 |
| 2021/0021518 A1* | 1/2021 | Chand | H04L 12/4633 |
| 2021/0021564 A1* | 1/2021 | Chand | H04L 63/166 |
| 2021/0021565 A1* | 1/2021 | Chand | H04L 67/28 |
| 2021/0029075 A1* | 1/2021 | Yu | H04L 67/1002 |

FOREIGN PATENT DOCUMENTS

| | | |
|---|---|---|
| JP | 2011-176468 A | 9/2011 |
| JP | 2011-530883 A | 12/2011 |
| JP | 2014-045245 A | 3/2014 |
| JP | 2014-049807 A | 3/2014 |
| JP | 2014-082624 A | 5/2014 |

OTHER PUBLICATIONS

Written Opinion for PCT/JP2018/011033 dated Jun. 19, 2018 [PCT/ISA/237].

Japanese Office Action for JP Application No. 2019-509591 dated Jan. 5, 2021 with English Translation.

* cited by examiner

Fig. 4

| SERVER NAME | DOMAIN NAME | IP ADDRESS | INQUIRY TIME | STORING TIME |
|---|---|---|---|---|
| ORIGIN SERVER 40-1 | aaa.jp | 192.123.0.1 | 11:12 | 24h |
| ORIGIN SERVER 40-2 | bbb.jp | 192.456.0.2 | 10:43 | 12h |
| ORIGIN SERVER 40-3 | ccc.jp | 192.789.0.3 | 09:55 | 36h |

Fig. 5

| DOMAIN NAME | IP ADDRESS |
|---|---|
| aaa.jp | 192.123.0.1 |
| bbb.jp | 192.456.0.2 |
| ccc.jp | 192.789.0.3 |

RELAY DEVICE, NETWORK SYSTEM, AND NETWORK CONTROL METHOD

CROSS REFERENCE TO RELATED APPLICATIONS

This application is a National Stage of International Application No. PCT/JP2018/011033 filed Mar. 20, 2018, claiming priority based on Japanese Patent Application No. 2017-070400 filed Mar. 31, 2017, the disclosure of which is incorporated herein in its entirety.

TECHNICAL FIELD

The present invention relates to a relay device, a network system and a network control method.

BACKGROUND ART

As a protocol for processing a network application in a communication network such as the Internet, a transmission control protocol (TCP protocol) is known. The TCP protocol is a communication protocol that performs communication by using a virtual dedicated communication line called a connection. A communication protocol of this kind is called a connection-oriented protocol.

In a connection-oriented communication protocol, a client-side device checks a status of a server (whether the server is in a state of being ready to respond, whether the server is connectable to a port, and the like) before performing transmission and reception of data, establishes a connection between the client and the server, and then, performs the transmission and reception of the data through the connection. Since communication is started after a connection is established in this way, connection-oriented communication is characterized by higher reliability than connectionless communication in which a client-side device performs data transmission and reception without checking the status of a server.

As a procedure for establishing a connection by a connection-oriented protocol, there is a 3-Way Handshake. In the 3-Way Handshake, by transmitting and receiving an SYN packet indicating that establishment of a connection from a transmission source to a destination is requested and an ACK packet indicating that establishment of the connection is permitted, establishment of the connection is performed. FIG. 11 is a sequence diagram illustrating a procedure when the 3-Way Handshake is performed between a client and a server.

The client transmits a synchronize packet (SYN packet) to the server (S1).

When receiving the SYN packet, the server transmits an ACKnowledgement (ACK) packet to the client (S2). Further, the server transmits an SYN packet to the client.

The ACK packet is a packet indicating that establishment of a connection is permitted.

When receiving the ACK packet and the SYN packet, the client transmits an ACK packet to the server (S3).

When communication is performed by using the TCP protocol, a 3-Way Handshake is performed between devices before starting the communication and a connection is established. Accordingly, in a configuration in which communication between a mobile internet protocol (IP) network and an external network is performed through a relay device in order to accommodate characteristics of the networks, 3-Way Handshakes are respectively performed between a client and the relay device and between the relay device and a server.

FIG. 12 is a sequence diagram illustrating an example of operation for a mobile terminal 10a to start communication with a communication destination to which the mobile terminal 10a requests a connection. An operation in which the mobile terminal 10a connects to a server 40a in FIG. 12 will be described below by way of example.

The mobile terminal 10a inquires an IP address related to a domain name of a connection destination from a domain name system (DNS) server 30a (S001).

When receiving the inquiry from the mobile terminal 10a, the DNS server 30a identifies an IP address related to the received domain name. The DNS server 30a transmits the identified IP address to the mobile terminal 10a (S002).

The mobile terminal 10a transmits, to a relay device 20a, an SYN packet for establishing a connection to a server 40a that is a connection destination (S003).

When receiving the SYN packet from the mobile terminal 10a, the relay device 20a transmits an ACK packet to the mobile terminal 10a. Further, the relay device 20a transmits, to the mobile terminal 10a, an SYN packet for requesting establishment of a connection from the relay device 20a to the mobile terminal 10a (S004).

When receiving the SYN packet from the relay device 20a, the mobile terminal 10a transmits an ACK packet to the relay device 20a (S005).

The relay device 20a transmits an SYN packet to the server 40a (S006).

When receiving the SYN packet from the relay device 20a, the server 40a transmits an ACK packet to the relay device 20a. Further, the server 40a transmits an SYN packet to the relay device 20a in order to request establishment of a connection from the server 40a to the relay device 20a (S007).

When receiving the SYN packet from the server 40a, the relay device 20a transmits an ACK packet to the server 40a (S008).

When the connection between the mobile terminal 10a and the relay device 20a and the connection between the relay device 20a and the server 40a are established, the mobile terminal 10a transmits a hypertext transfer protocol request (HTTP request) to the server 40a through the relay device 20a (S009).

The server 40a, which has received the HTTP request, transmits an HTTP response to the mobile terminal 10a through the relay device 30a (S010). The HTTP response is a packet for providing a content stored in the server, for example.

By the procedure as described above, transmission and reception of data are performed between the mobile terminal 10a and the server 40a.

Patent Literature (PTL) 1 describes a router that, in place of a DNS server, responds with an IP address. According to PTL 1, by storing information concerning IP addresses in a cache, the router reduces occasions where IP addresses are resolved by connecting to a wide area network (WAN) side.

PTL 2 describes a communication method for performing communication between terminals through a relay device that has a network address translation (NAT) function. According to PTL 2, each terminal stores reports on transmission and reception of real-time transport protocol (RTP) packets from other terminals for a predetermined period of time. Based on information in a stored port, each terminal repeats transmission until the packet is received at a counterpart device in order to prevent the relay device from performing erroneous packet processing.

CITATION LIST

Patent Literature

[PTL 1] Japanese Unexamined Patent Application Publication No. 2014-49807
[PTL 2] Japanese Unexamined Patent Application Publication No. 2008-236297
[PTL 3] Japanese Unexamined Patent Application Publication No. 2014-82624
[PTL 4] Japanese Unexamined Patent Application Publication No. 2014-45245
[PTL 5] Japanese Unexamined Patent Application Publication No. 2011-176468

SUMMARY OF INVENTION

Technical Problem

Because a 3-Way Handshake (establishment of a connection) performed for using a connection-oriented communication protocol takes time, the 3-Way Handshake can form a bottleneck when communication between a mobile terminal and a server is performed. However, as described above, in order to perform communication between the mobile terminal and the server by using the connection-oriented communication protocol, the 3-Way Handshake is required twice as illustrated in FIG. 12.

The invention described in PTL 1 does not start communication with a connection destination by performing a 3-Way Handshake. The invention described in PTL 2 also does not start communication with a connection destination by performing a 3-Way Handshake.

Therefore, an object of the present invention is to enable connection establishment for reducing influence of a bottleneck which occurs when communication using a connection-oriented protocol is performed and for reducing a turn-around time (TAT).

Solution to Problem

A network system according to one aspect of the present invention includes:
a server that provides a content to a communication terminal;
a relay device that establishes a connection with the server; and
a DNS server that stores an IP address of the server.

When accepting an inquiry of the IP address of the server being a providing source of the content from the communication terminal, the relay device inquires the IP address from the DNS server, and
performs in parallel processing of transmitting the IP address received in response to the inquiry to the communication terminal, and processing of establishing a connection with the server assigned the IP address.

A relay device according to one aspect of the present invention
when accepting an inquiry of an IP address of a server being a providing source of a content from a communication terminal, inquires the IP address of the server being a providing source of the content from a DNS server, and
performs in parallel processing of transmitting the IP address received in response to the inquiry to the communication terminal, and processing of establishing a connection with the server being a providing source of the content based on the IP address.

A network system according to one aspect of the present invention includes:
a server that provides a content to a communication terminal;
a relay device that establishes a connection with the server; and
a DNS server that stores an IP address of the server.

The DNS server transmits the IP address to the relay device when accepting an inquiry of the IP address of the server being a providing source of the content from the communication terminal.

The relay device performs in parallel processing of transmitting the IP address to the communication device, and processing of establishing a connection with the server assigned the IP address.

A network control method according to one aspect of the present invention, in a network system including
a server that provides a content to a communication terminal,
a relay device that establishes a connection with the server, and
a DNS server that stores an IP address of the server, includes:
by the relay device,
when accepting an inquiry of the IP address of the server being a providing source of the content from the communication terminal, inquiring the IP address from the DNS server; and
performing in parallel processing of transmitting the IP address received in response to the inquiry to the communication terminal, and processing of establishing a connection with the server being a providing source of the content, based on the IP address.

Advantageous Effects of Invention

The present invention can provide advantageous effects of enabling connection establishment for reducing influence of a bottleneck which occurs when communication using a connection-oriented protocol is performed and for reducing a TAT.

BRIEF DESCRIPTION OF DRAWINGS

FIG. 4 is an example of information stored by a cache memory according to the first example embodiment.

FIG. 5 is an example of information stored by a DNS server according to the first example embodiment.

EXAMPLE EMBODIMENT

First Example Embodiment

[Description of Configuration]

A first example embodiment according to the present invention will be described in detail with reference to drawings.

Figure 1:
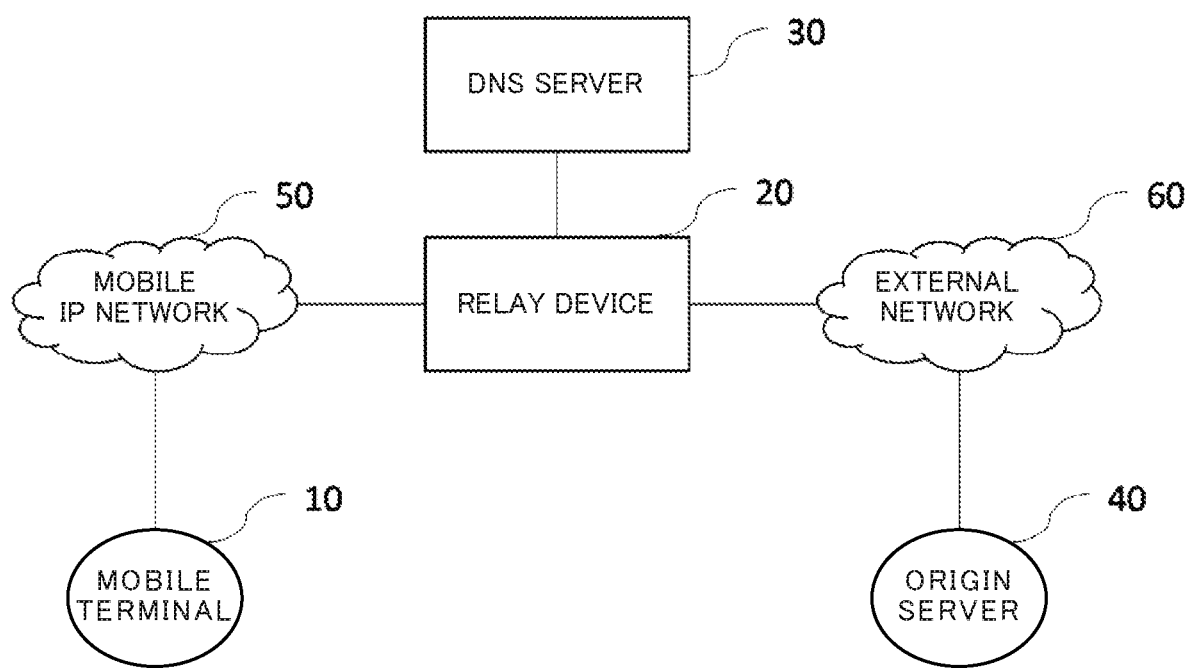
FIG. 1 is a block diagram illustrating a configuration example of a network according to a first example embodiment.

FIG. 1 is a block diagram illustrating a configuration example of a network according to the first example embodiment.

The network according to the first example embodiment includes a mobile terminal 10, a relay device 20, a DNS server 30, an origin server 40, a mobile IP network 50 and an external network 60.

The mobile terminal 10 performs transmission and reception of data (packets) to and from the origin server 40 through the mobile IP network 50, the relay device 20 and the external network 60. The mobile terminal 10 is a portable terminal such as a laptop type computer, a tablet type computer, or a smartphone, or other communication terminals, for example.

Figure 2:
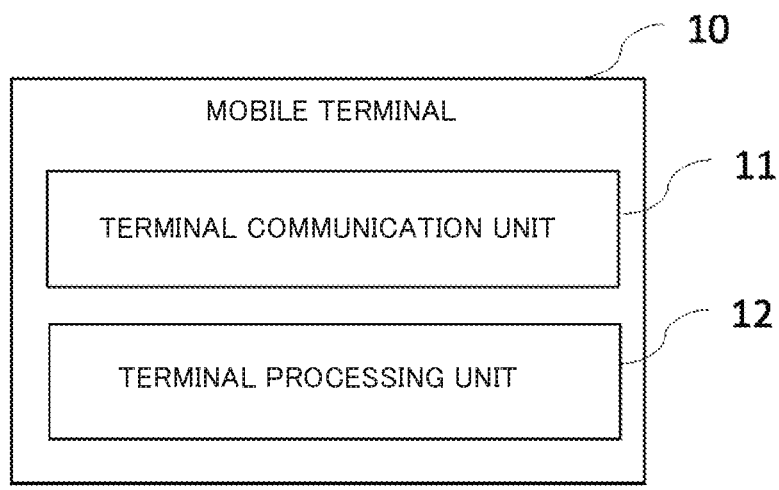
FIG. 2 is a block diagram illustrating a configuration example of a mobile terminal according to the first example embodiment.

FIG. 2 is a block diagram illustrating a configuration example of the mobile terminal 10 according to the first example embodiment. The mobile terminal 10 includes a terminal communication unit 11 and a terminal processing unit 12.

The terminal communication unit 11 is a communication interface for performing transmission and reception of packets to and from the relay device 20 through the mobile IP network 50 in response to an instruction from the terminal processing unit 12.

The terminal processing unit 12 identifies a domain name of a communication destination with which the mobile terminal 10 requests a connection. In order to acquire an IP address related to the identified domain name, the terminal processing unit 12 instructs the terminal communication unit 11 to transmit the domain name to the DNS server 30 as an inquiry.

When the terminal processing unit 12 acquires an IP address related to the inquiry, the terminal processing unit 12 performs a 3-Way Handshake with the relay device 20 in order to establish a connection with a destination to which the IP address is assigned. When the 3-Way Handshake is completed (the connection is established), the terminal processing unit 12 transmits an HTTP request. The HTTP request is a request for data such as a content, a request for acceptance of data to be transmitted, a request for a response, or the like, for example.

The relay device 20 establishes a connection between the mobile terminal 10 and a communication destination with which the mobile terminal 10 requests a connection.

Figure 3:
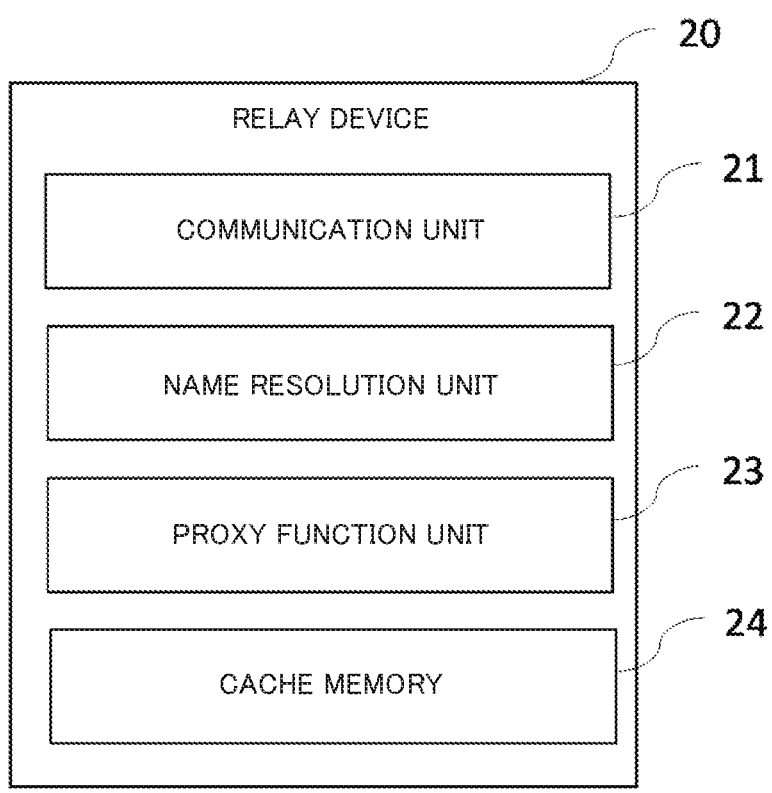
FIG. 3 is a block diagram illustrating a configuration example of a relay device according to the first example embodiment.

FIG. 3 is a block diagram illustrating a configuration example of the relay device 20 according to the first example embodiment. The relay device 20 includes a communication unit 21, a name resolution unit 22, a proxy function unit 23 and a cache memory 24.

The communication unit 21 is a communication interface for performing transmission and reception of packets to and from other devices through the mobile IP network 50 and the external network 60.

The name resolution unit 22 refers to the cache memory 24 that stores a domain name and an IP address in association with each other and inquires for information concerning an IP address related to an inquiry from the mobile terminal 10.

When the cache memory 24 stores an IP address related to the inquiry from the mobile terminal 10, the name resolution unit 22 transmits the IP address to the mobile terminal 10. When the cache memory 24 does not store an IP address related to the inquiry from the mobile terminal 10, the name resolution unit 22 transmits a domain name of the communication destination with which the mobile terminal 10 requests a connection to the DNS server 30 as an inquiry.

The name resolution unit 22 transmits the domain name of the communication destination with which the mobile terminal 10 requests a connection and the IP address received from the DNS server 30 to the cache memory 24.

When acquiring the IP address of the communication destination with which the mobile terminal 10 requests a connection, the proxy function unit 23 performs a 3-Way Handshake with the destination to which the IP address is assigned in order to establish a connection with the destination to which the IP address is assigned.

The cache memory 24 stores information in which the IP address and the domain name received from the name resolution server 22 are associated with each other. Information stored in the cache memory 24 is deleted after expiration of a predetermined time period.

FIG. 4 is an example of information stored by the cache memory 24 according to the first example embodiment. Information stored by the cache memory 24 is, for example, an IP address, a server name of a destination to which the IP address is assigned, a domain name, a time at which an inquiry from the mobile terminal 10 has been received, a storing period, and the like. Note that information stored by the cache memory 24 is not limited to the items given above. Further, the cache memory 24 may store a plurality of IP addresses for one domain name. The name resolution unit 22 may select and transmit any one of the IP addresses in response to an inquiry from the mobile terminal 10.

The DNS server 30 stores information in which a domain name and an IP address are associated with each other. When receiving a domain name from the relay device 20 as an inquiry, the DNS server 30 refers to the information stored by the DNS server 30 and identifies an IP address related to the inquiry. The DNS server 30 transmits the identified IP address to the relay device 20.

FIG. 5 is an example of information stored by the DNS server 30 according to the first example embodiment. The DNS server 30 stores, for example, information in which a domain name and an assigned IP address are associated with each other. Note that information stored by the DNS server 30 is not limited to the items given above, and the DNS server 30 may store information in which a host name and an IP address are associated with each other, for example.

Further, the DNS server 30 may store a plurality of IP addresses for one domain name, and may select and transmit any one of the IP addresses in response to an inquiry from the relay device 20.

The origin server 40 is a server that contains contents to be provided to the mobile terminal 10. Contents are texts, graphics, sounds, images, videos or data that are combinations thereof. When receiving an HTTP request from the mobile terminal 10 through the mobile IP network 50 and the external network 60, the origin server 40 transmits an HTTP response to the mobile terminal 10 as a response to the request. For example, when receiving an HTTP request that requests a content from the mobile terminal 10, the origin server 40 transmits an HTTP response that permits the use of the content to the mobile terminal.

Figure 6:
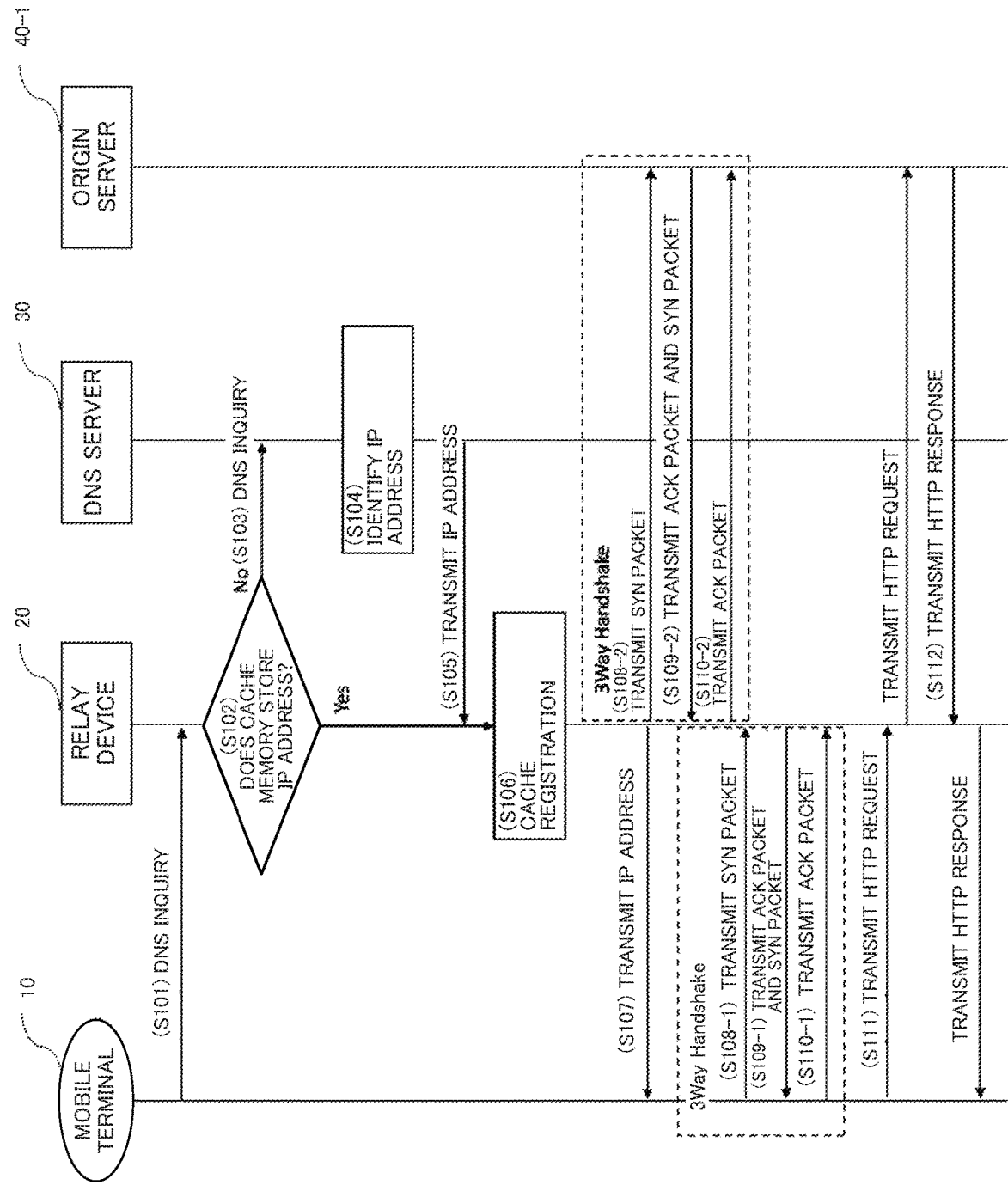
FIG. 6 is a sequence diagram illustrating an example of operation of a system according to the first example embodiment.

An operation of the network system according to the first example embodiment of the present invention will be described with reference to FIG. 6. While the following description is provided by taking the operation performed when the mobile terminal 10 requests a content from an origin sever 40-1 as an example, the network system according to the invention is not limited to the following case.

The mobile terminal 10 identifies that a domain name of a destination for requesting a connection is "aaa.jp". In order to acquire an IP address related to the identified domain name, the mobile terminal 10 transmits the domain name "aaa.jp" to the relay device 20 as an inquiry (S101, a DNS inquiry).

When receiving the domain name from the mobile terminal 10 as the inquiry, the relay device 20 refers to information stored by the cache memory 24 (S102).

When the cache memory 24 does not store an IP address related to the inquiry, the relay device 20 transmits the domain name received from the mobile terminal 10 to the DNS server 30 as an inquiry (S103).

When receiving the domain name from the relay device 20 as the inquiry, the DNS server 30 refers to information stored by the DNS server 30 and identifies an IP address (S104).

The DNS server 30 transmits the identified IP address, "192.123.0.1", to the relay device 20 (S105).

The relay device 20 registers the IP address "192.123.0.1" received from the DNS server 30 and the domain name "aaa.jp" in the cache memory 24 (S106, a cache registration).

The relay device 20 transmits the identified IP address "192.123.0.1" to the mobile terminal 10 (S107).

The relay device 20 performs a 3-Way Handshake with the origin server 40-1 which is a communication destination with which the mobile terminal 10 requests a connection, in parallel with the processing of transmitting the identified IP address to the mobile terminal 10 (S107).

The relay device 20 transmits an SYN packet indicating that establishment of a connection is requested to the origin server 40-1 (S108-2).

The origin server 40-1 transmits an ACK packet indicating that the establishment of the connection is permitted to the relay device 20. Further, the origin server 40-1 transmits an SYN packet indicating that establishment of a connection is requested to the relay device 20 (S109-2).

The relay device 20 transmits an ACK packet indicating that the establishment of the connection is permitted to the origin server 40-1 (S110-2).

When receiving the IP address related to the inquiry from the relay device 20, the mobile terminal 10 performs a 3-Way Handshake with the relay device 20.

The mobile terminal 10 transmits an SYN packet indicating that establishment of a connection is requested to the relay device 20 (S108-1).

The relay device 20 transmits an ACK packet indicating that the establishment of the connection is permitted to the mobile terminal 10. Further, the relay device 20 transmits an SYN packet indicating that establishment of a connection is requested to the mobile terminal 10 (S109-1).

The mobile terminal 10 transmits an ACK packet indicating that the establishment of the connection is permitted to the relay device 20 (S110-1).

The mobile terminal 10 transmits an HTTP request indicating that the mobile terminal 10 needs to use a content of the origin server 40 to the origin server 40-1 through the relay device 20. (S111).

The origin server 40-1 transmits an HTTP response indicating that the origin server 40-1 permits the use of the content to the mobile terminal 10 (S112).

Note that when the cache memory 24 stores an IP address of a communication destination with which the mobile terminal 10 requests a connection, the relay device 20 transmits the IP address to the mobile terminal 10, based on the information in the cache memory 24. In other words, when the cache memory 24 stores the IP address of the origin server 40-1, the relay device 20 performs the operation of S106 after the operation of S102.

Further, the SYN packet and the ACK packet transmitted by the relay device 20 to the mobile terminal 10 in S109-1 may be transmitted as separate packets or may be transmitted as a single packet called a SYN/ACK packet. The SYN packet and the ACK packet transmitted by the origin server 40-1 to the relay device 20 in S109-2 may be transmitted as separate packets or may be transmitted as a single packet called a SYN/ACK packet.

A timing when the relay device 20 starts the 3-Way Handshake with the communication destination with which the mobile terminal 10 requests a connection (S108-2) is not limited to a timing when the relay device 20 transmits the IP address to the mobile terminal 10 (S107). For example, the relay device 20 may start the 3-Way Handshake with the communication destination with which the mobile terminal 10 requests a connection at a timing when transmitting the IP address received from the DNS server 30 and the domain name to the cache memory 24 (S106). For example, the relay device 20 may start the 3-Way Handshake with the communication destination with which the mobile terminal 10 requests a connection (S108-2) after transmitting the IP address received from the DNS server 30 and the domain name to the cache memory 24 (S106), then may transmit the IP address to the mobile terminal 10 (S107). For example, the relay device 20 may start the 3-Way Handshake with the communication destination with which the mobile terminal 10 requests a connection (S108-2) simultaneously at the timing when the relay device 20 transmits the IP address of the origin server 40-1 (S107).

As described above, in the network system according to the first example embodiment of the present invention, the relay device 20 inquires an IP address from the DNS server 30 in response to the request from the mobile terminal 10. In this way, the relay device 20 can start a 3-Way Handshake with the communication destination for requesting a connection without waiting for the completion of a 3-Way Handshake from the mobile terminal 10, and can reduce the time required for starting the communication.

Second Example Embodiment

Figure 7:
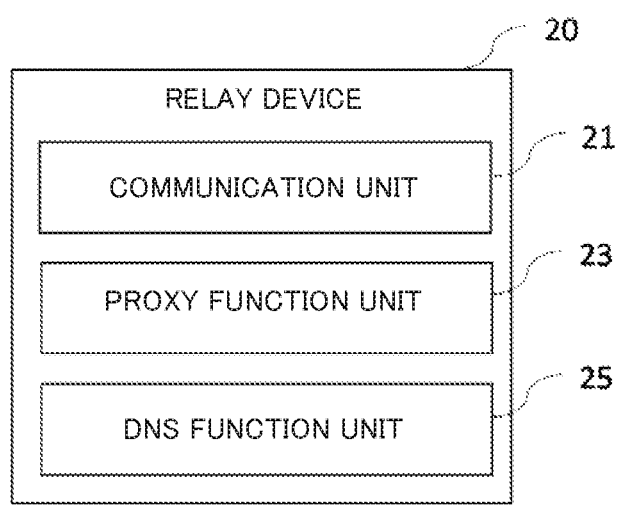
FIG. 7 is a block diagram illustrating a configuration example of a relay device according to a second example embodiment.

A second example embodiment according to the present invention will be described in detail with reference to drawings. Note that a basic configuration of the present example embodiment is similar to that of the first example embodiment, and therefore the following description will focus on differences from the first example embodiment.
[Description of Configuration]
FIG. 7 is a block diagram illustrating a configuration example of a relay device 20 according to the second example embodiment. As a difference from the relay device 20 according to the first example embodiment, the relay device 20 according to the present example embodiment includes a DNS function unit 25.

The DNS function unit 25 is equivalent to the DNS server 30 in the first example embodiment. This enables the relay device 20 to know an IP address of a communication destination with which a mobile terminal 10 requests a connection without making an inquiry to a DNS server 30.

Figure 8:
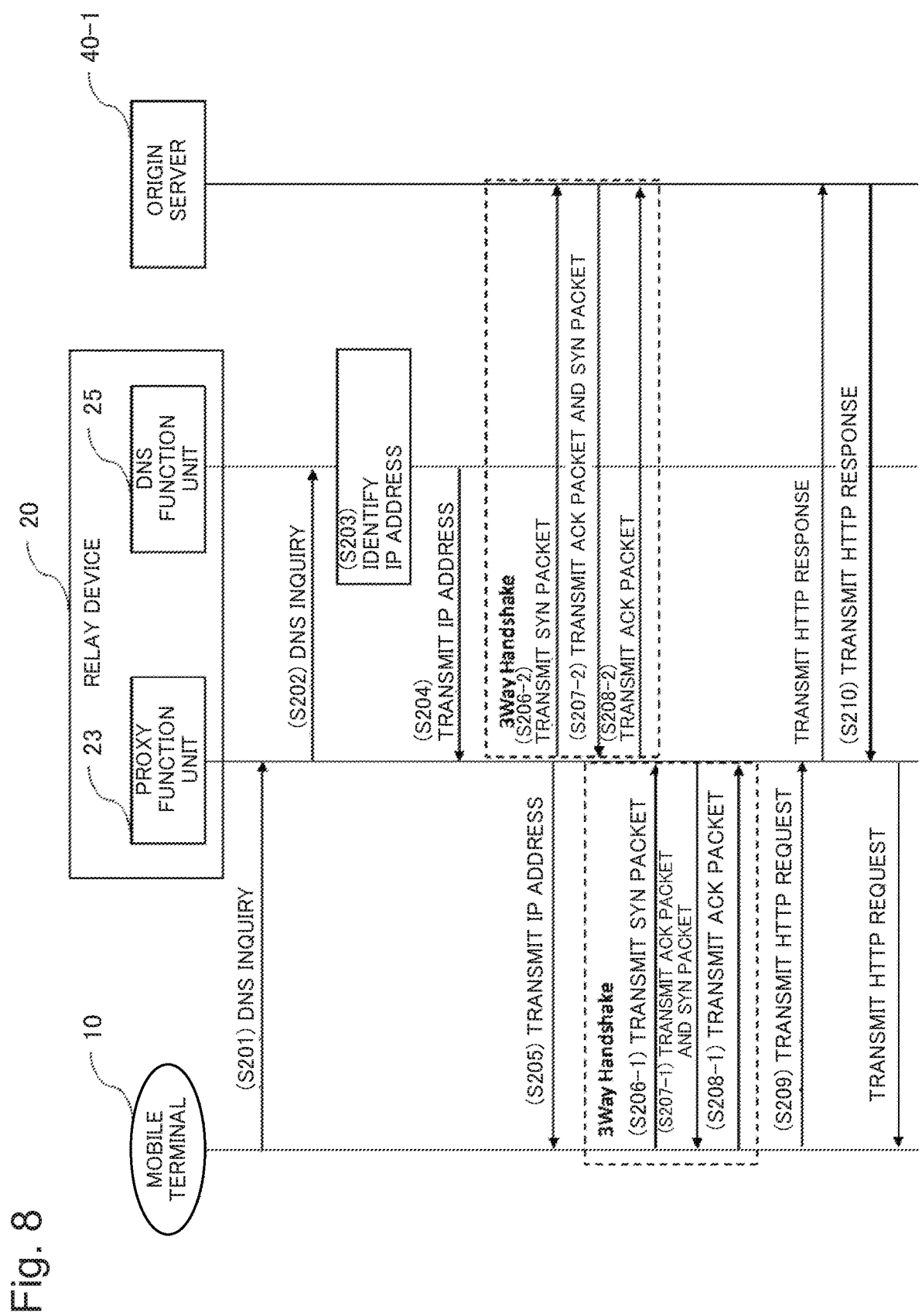
FIG. 8 is a sequence diagram illustrating an example of operation of a system according to the second example embodiment.

An operation of a network system according to the second example embodiment of the present invention will be described with reference to FIG. 8. While the following description is provided by taking the operation performed when the mobile terminal 10 requests a content from an origin sever 40-1 as an example, the network system according to the present invention is not limited to the following case.

The mobile terminal 10 identifies that a domain name of a destination for requesting a connection is "aaa.jp". In order to acquire an IP address related to the identified domain name, the mobile terminal 10 transmits the domain name "aaa.jp" to the relay device 20 as an inquiry (S201, a DNS inquiry).

A proxy function unit 23 of the relay device 20 receives a domain name from the mobile device 10 as an inquiry. The proxy function unit 23 transmits the domain name received from the mobile terminal 10 to the DNS function unit 25 as an inquiry (S202).

When receiving the domain name from the proxy function unit 23 as the inquiry, the DNS function unit 25 inquires for information stored by the DNS function unit 25 and identifies an IP address (S203).

The DNS function unit 25 transmits the identified IP address, "192.123.0.1", to the proxy function unit 23 (S204).

The proxy function unit 23 transmits the identified IP address "192.123.0.1" to the mobile terminal 10 (S205).

S206 through S210 are similar to S108 through S112 in the first example embodiment.

As described above, in the network system according to the second example embodiment of the present invention, the relay device 20, which includes the DNS function unit 25 that is equivalent to the DNS server 30, identifies an IP address of a communication destination with which the mobile terminal 10 requests a connection. In this way, it is possible to reduce a time required for the mobile terminal 10 to acquire an IP address.

Third Example Embodiment

Figure 9:
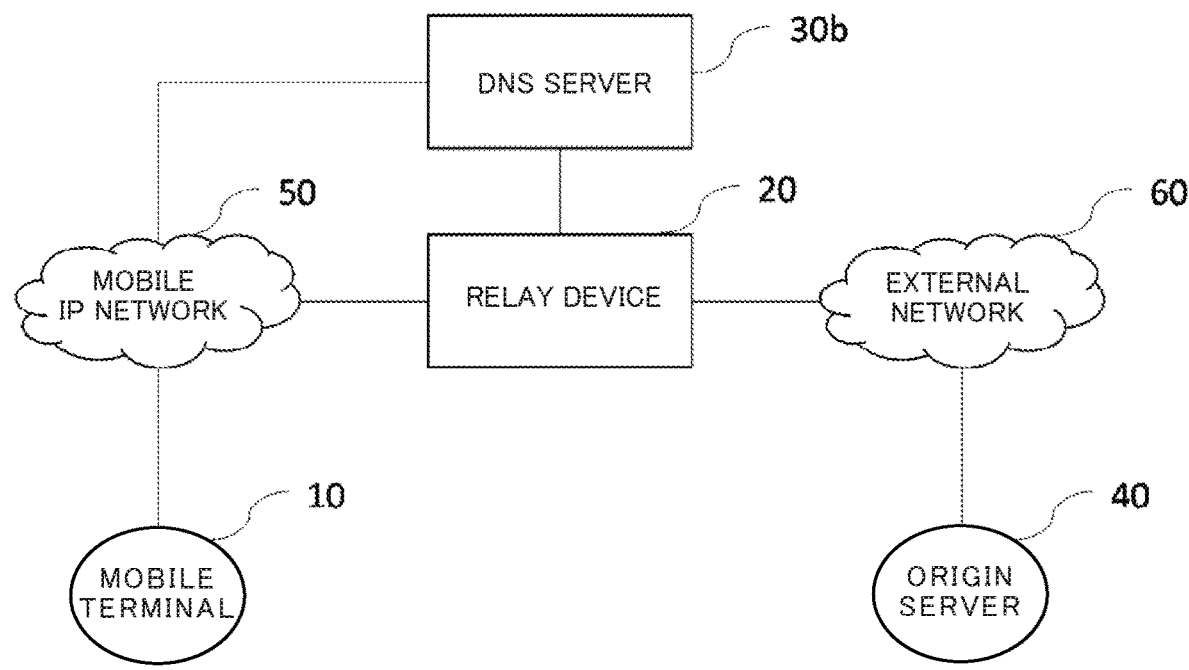
FIG. 9 is a block diagram illustrating a configuration example of a network according to a third example embodiment.

A third example embodiment of the present invention will be described in detail with reference to drawings. Note that the technique according to the third example embodiment is applicable to any of the first and second example embodiments. A basic configuration of the present example embodiment is similar to that of the first example embodiment and therefore the following description will focus on differences from the first example embodiment.
[Description of Configuration]
FIG. 9 is a diagram illustrating an overview of a configuration of a network system according to the third example embodiment of the present invention. Note that elements labeled with the same reference numerals as those in FIG. 1 perform processing operations as those described with respect to FIG. 1 and detailed description thereof will be omitted.

A mobile terminal 10 includes a terminal communication unit 11 and a terminal processing unit 12.

The terminal communication unit 11 is a communication interface for performing transmission and reception of packets to and from a relay device 20 and a DNS server 30b through a mobile IP network 50 in response to an instruction from the terminal processing unit 12.

The terminal processing unit 12 identifies a domain name of a communication destination with which the mobile terminal 10 requests a connection. In order to acquire an IP address related to the identified domain name, the terminal processing unit 12 instructs the terminal communication unit 11 to transmit the domain name to the DNS server 30b as an inquiry.

The DNS server 30b stores information in which a domain name and an IP address are associated with each other. When receiving a domain name from the mobile terminal 10 as an inquiry, the DNS server 30b refers to the information stored by the DNS server 30b, identifies an IP address related to the inquiry, and transmits the identified IP address to the relay device 20 and the mobile terminal 10.

Figure 10:
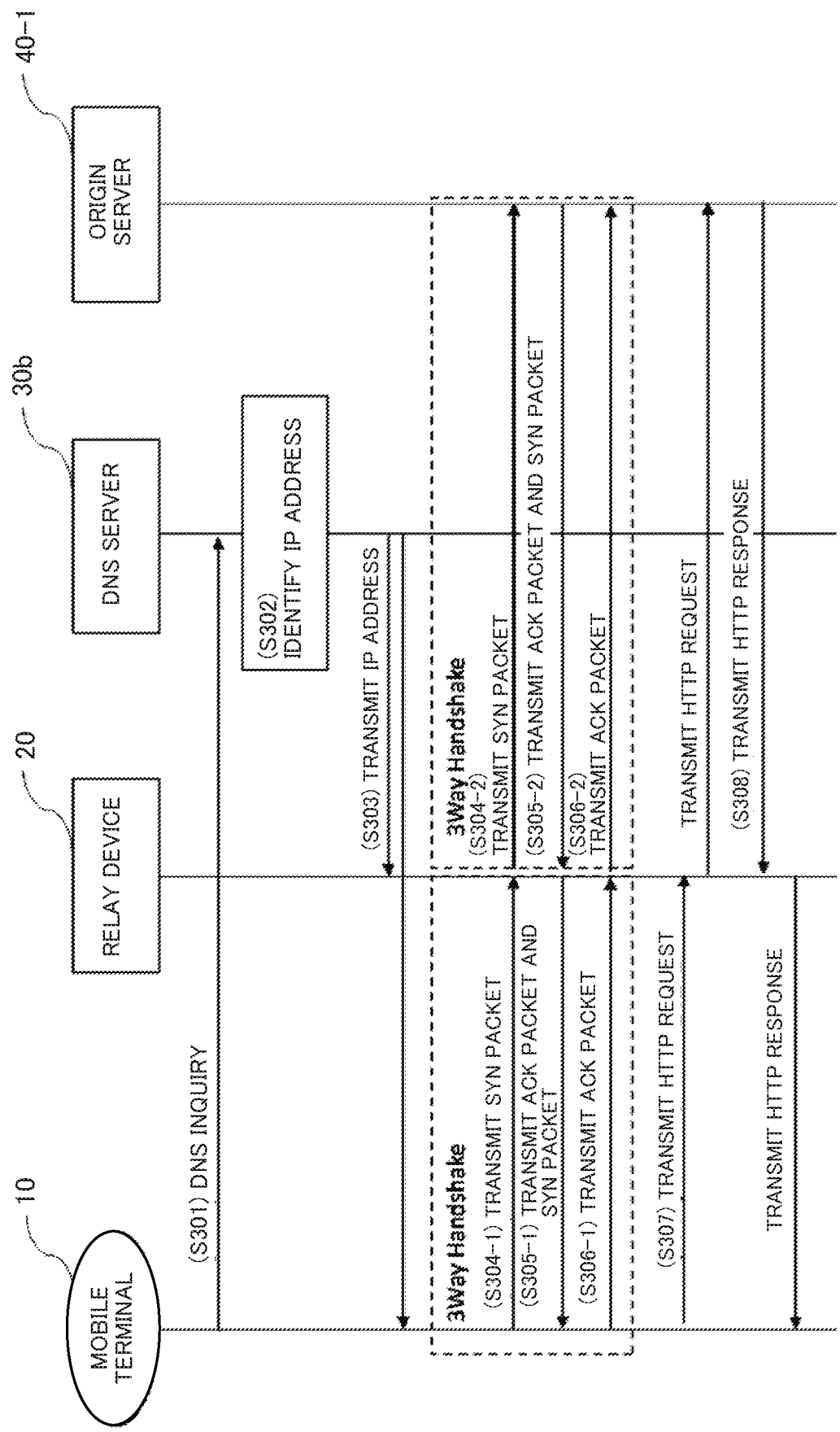
FIG. 10 is a sequence diagram illustrating an example of operation of a system according to the third example embodiment.
Figure 11:
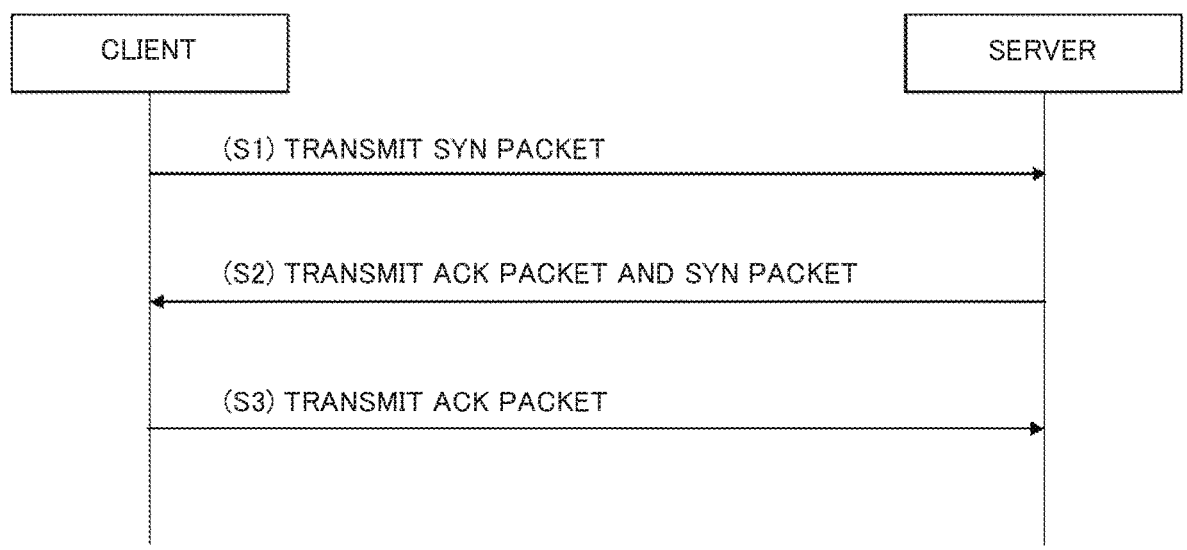
FIG. 11 is a sequence diagram illustrating a 3-Way Handshake operation.
Figure 12:
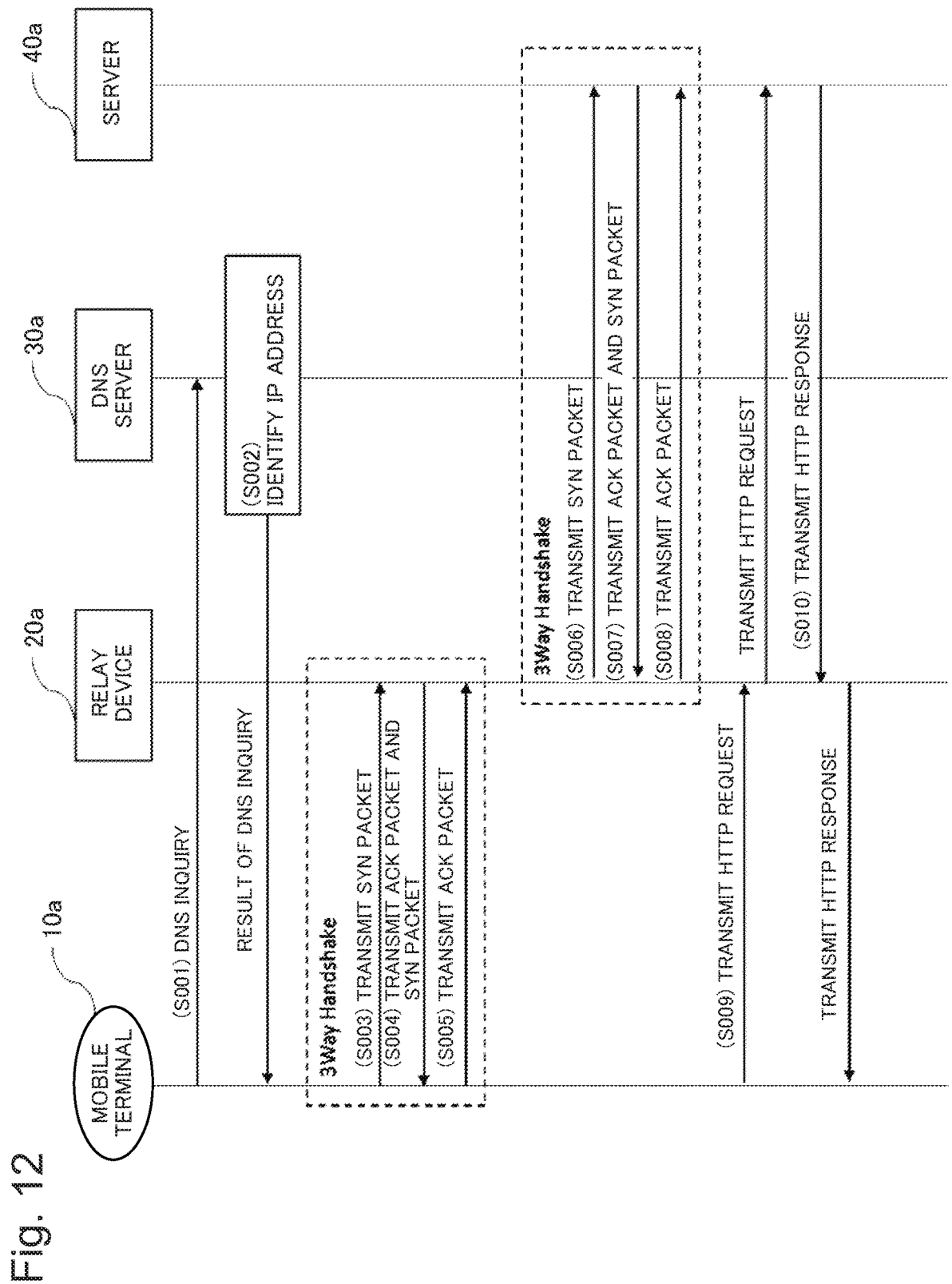
FIG. 12 is a sequence diagram illustrating an example of operation for a mobile terminal to start communication with a communication destination to which the mobile terminal requests a connection.

An operation of the network system according to the third example embodiment will be described with reference to FIG. 10.

The mobile terminal 10 identifies that a domain name of a destination for requesting a connection is "aaa.jp". In order to acquire an IP address related to the identified domain name, the mobile terminal 10 transmits the domain name "aaa.jp" to the DNS server 30b as an inquiry (S301, a DNS inquiry).

When receiving the domain name from the mobile terminal 10 as the inquiry, the DNS server 30b refers to the information stored by the DNS server 30b and identifies an IP address (S302).

The DNS server 30b transmits the identified IP address, "192.123.0.1", to the mobile terminal 10 and the relay device 20 (S303).

S304 through S308 are similar to S108 through S112 in the first example embodiment.

As described above, in the network system according to the third example embodiment of the present invention, the mobile terminal 10 inquires an IP address of a communication destination with which the mobile terminal 10 requests a connection from the DNS server 30b, and the DNS server 30b transmits a result of the inquiry to the mobile terminal 10 and the relay device 20. In this way, the relay device 20 can start a 3-Way Handshake with the communication destination for requesting a connection without waiting for the completion of a 3-Way Handshake with the mobile terminal 10, and can reduce the time required for starting the communication.

While example embodiments of the present invention have been described above, the present invention is not limited to the example embodiments described above. The present invention can be implemented based on variations, replacements and adjustments of each of the example embodiments. Further, the present invention can also be implemented by combining any of the example embodiments. In other words, the present invention includes various variations and modifications that can be implemented in accordance with the whole disclosure and the technical ideals in the present specification. That is, it would be understood that the present invention includes various variations and modifications that could be conceived by those skilled in the art in accordance with the whole disclosure and the technical ideas, including the claims. In particular, any numerical values or subranges included within ranges of numerical values recited herein should be construed as being specifically recited even when any numerical value or subrange included in the ranges is not explicitly recited.

Further, a computer, a central processing unit (CPU), a micro-processing unit (MPU) or the like of a mobile terminal, a relay device, a DNS, and an origin server according to the present invention may execute a software (program) that implements functions of each of the example embodiments described above. The mobile terminal, the relay device, the DNS, and the origin server may acquire the software (program) that implements functions of each of the example embodiments described above through any of various storage media such as, for example, a compact disc recordable (CD-R), or a network. A program acquired by the mobile terminal, the relay device, the DNS, and the origin server, and a recording medium on which the program is stored constitute the present invention. Note that the software (program) may be stored in predetermined storage units included in the mobile terminal, the relay device, the DNS, and the origin server in advance. A computer, a CPU, a MPU or the like of the mobile terminal, the relay device, the DNS, and the origin server may read out and execute a program code of the acquired software (program).

The whole or part of the example embodiments disclosed above can be described as, but not limited to, the following supplementary notes.

[Supplementary Note 1]
A network system includes:
a server that provides a content to a communication terminal;
a relay device that establishes a connection with the server; and
a DNS server that stores an IP address of the server, wherein,
when accepting an inquiry of the IP address of the server being a providing source of the content from the communication terminal, the relay device inquires the IP address from the DNS server, and
performs in parallel processing of transmitting the IP address received in response to the inquiry to the communication terminal, and processing of establishing a connection with the server assigned the IP address.

[Supplementary Note 2]
The network system according to supplementary note 1, wherein
the relay device includes a cache memory that stores the IP address received from the DNS server,
transmits the IP address to the communication terminal when the cache memory stores the IP address related to the inquiry from the communication terminal, and
inquiries the IP address from the DNS server when the cache memory does not store the IP address related to the inquiry from the communication terminal.

[Supplementary Note 3]
The network system according to supplementary note 1, wherein
the relay device includes a DNS function unit that stores the IP address of the server,
inquires for the DNS function unit when accepting the inquiry of the IP address, and transmits the IP address of the server being a providing source of the content to the communication device.

[Supplementary Note 4]
The network system according to any one of supplementary notes 1 to 3, wherein
the relay device performs a 3-Way Handshake in order to establish a TCP connection with the server.

[Supplementary Note 5]
A relay device that,
when accepting an inquiry of an IP address of a server being a providing source of a content from a communication terminal, inquires the IP address of the server being a providing source of the content from a DNS server, and
performs in parallel processing of transmitting the IP address received in response to the inquiry to the communication terminal, and processing of establishing a connection with the server being a providing source of the content based on the IP address.

[Supplementary Note 6]
The relay device according to supplementary note 5, further includes:
a cache memory that stores the IP address received from the DNS server, wherein,
the relay device transmits the IP address to the communication terminal when the cache memory stores the IP address related to the inquiry from the communication terminal, and
inquiries the IP address from the DNS server when the cache memory does not store the IP address related to the inquiry from the communication terminal.

[Supplementary Note 7]
The relay device according to supplementary note 5, further includes:
a DNS function unit that stores the IP address of the server, wherein,
the relay device transmits the IP address to the communication terminal when accepting the inquiry from the communication terminal.

[Supplementary note 8]
A network system includes:
a server that provides a content to a communication terminal;
a relay device that establishes a connection with the server; and
a DNS server that stores an IP address of the server, wherein,
the DNS server transmits the IP address to the relay device when accepting an inquiry of the IP address of the server being a providing source of the content from the communication terminal, and
the relay device performs in parallel processing of transmitting the IP address to the communication device, and processing of establishing a connection with the server assigned the IP address.

[Supplementary Note 9]
The network system according to supplementary note 8, wherein,
the DNS server respectively transmits the IP address related to the inquiry to the relay device and the communication terminal when accepting the inquiry.

[Supplementary Note 10]
A network control method in a network system including
a server that provides a content to a communication terminal,
a relay device that establishes a connection with the server, and
a DNS server that stores an IP address of the server, the method includes:
by the relay device, when accepting an inquiry of the IP address of the server being a providing source of the content from the communication terminal, inquiring the IP address from the DNS server; and performing in parallel processing of transmitting the IP address received in response to the inquiry to the communication terminal, and processing of establishing a connection with the server being a providing source of the content, based on the IP address.

The present invention has been described above by using the example embodiments described above as model examples. However, the present invention is not limited to the example embodiments described above. Specifically, various modes of the present invention that can be understood by those skilled in the art can be applied within the scope of the present invention.

REFERENCE SIGNS LIST 10, 10a Mobile terminal
11 Terminal communication unit
12 Terminal processing unit
20, 20a Relay device
21 Communication unit
22 Name resolution unit
23 Proxy function unit
24 Cache memory
25 DNS function unit
30, 30a, 30b DNS
40, 40-1 Origin server
50 Mobile IP network
60 External network

The invention claimed is:

1. A network system comprising:
 a communication terminal including a first memory and a first processor coupler to the first memory;
 a server including a second memory and a second processor coupled to the second memory, and providing a content to the communication terminal;
 a relay device including a third memory and a third processor coupled to the third memory, and establishing a connection between the server and the communication terminal; and
 a DNS server including a fourth memory storing an IP address of the server and a fourth processor coupled to the fourth memory, wherein,
 the DNS server transmits the IP address of the server to both of the relay device and the communication terminal, when accepting a DNS inquiry of the IP address of the server from the communication terminal,
 the relay device requests establishment of a connection between the server assigned the IP address and the relay device to the server, when accepting the IP address of the server from the DNS server, and
 the communication terminal requests establishment of a connection between the server assigned the IP address and the communication terminal to the relay device, when accepting the IP address of the server from the DNS server.

2. A network control method in a network system including
 a communication terminal that includes a first memory and a first processor coupled to the first memory,
 a server that includes a second memory and a second processor coupled to the second memory, and provides a content to the communication terminal,
 a relay device that includes a third memory and a third processor coupled to the third memory, and establishes a connection between the server and the communication terminal, and
 a DNS server that includes a fourth memory storing an IP address of the server and a fourth processor coupled to the fourth memory, the method comprising:
 by the DNS server, when accepting a DNS inquiry of the IP address of the server from the communication terminal, transmitting the IP address of the server to both of the relay device and the communication terminal;
 by the relay device, when accepting the IP address of the server from the DNS server requesting establishment of a connection the server assigned the IP address and the relay device to the server and
 by the communication terminal, when accepting the IP address of the server from the DNS server, requesting establishment of a connection between the server assigned the IP address and the communication terminal to the relay device.

* * * * *